United States Patent
Levens et al.

(10) Patent No.: US 6,396,851 B1
(45) Date of Patent: *May 28, 2002

(54) DTMF TONE DETECTION AND SUPPRESSION WITH APPLICATION TO COMPUTER TELEPHONY OVER PACKET SWITCHED NETWORKS

(75) Inventors: Bruce Levens; Paul R. Kerr, both of Natick; William S. Hoge, Boston; Daniel F. Daly, Holbrook, all of MA (US)

(73) Assignee: NMS Communications Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/803,675

(22) Filed: Mar. 9, 2001

Related U.S. Application Data

(63) Continuation of application No. 09/036,342, filed on Mar. 6, 1998, now Pat. No. 6,226,303.
(60) Provisional application No. 60/039,949, filed on Mar. 6, 1997.

(51) Int. Cl.[7] .................................................. H04J 3/12
(52) U.S. Cl. ........................................ 370/526; 370/352
(58) Field of Search .................................. 370/526, 352, 370/968, 307, 360; 708/312; 379/386, 283, 338; 455/430–432, 13.1, 552–557

(56) References Cited

U.S. PATENT DOCUMENTS

| | | | | | |
|---|---|---|---|---|---|
| 5,119,322 | A | * | 6/1992 | Stroobach | 708/312 |
| 5,257,309 | A | * | 10/1993 | Brandman et al. | 370/283 |
| 5,311,589 | A | * | 5/1994 | Bennett et al. | 379/386 |
| 6,226,303 | B1 | * | 5/2001 | Levens et al. | 370/526 |

* cited by examiner

*Primary Examiner*—Wellington Chin
*Assistant Examiner*—Prenell Jones
(74) *Attorney, Agent, or Firm*—Mintz, Levin, Cohn, Ferris, Glovsky and Popeo, P.C.

(57) ABSTRACT

A method of facilitating telephony communications over a packet-switched network includes detecting signaling tones in an audio stream and blocking them from the stream in response to the detecting. After the blocking, the audio stream is sent over an undependable channel in the packet-switched network. The detected signaling tones can be sent over a dependable channel instead of the undependable audio channel.

23 Claims, 2 Drawing Sheets

DTMF TONE DETECTION AND SUPPRESSION WITH APPLICATION TO COMPUTER TELEPHONY OVER PACKET SWITCHED NETWORKS

CROSS-REFERENCE TO RELATED APPLICATION

This application is a continuation of Ser. No. 09/036,342 filed Mar. 6, 1998, U.S. Pat. No. 6,226,303, which claims the benefit under 35 U.S.C. §119 (e) of provisional application No. 60/039,949, filed Mar. 6, 1997, which is herein incorporated by reference.

BACKGROUND OF THE INVENTION

It is known to use Dual-Tone, Multi-Frequency (DTMF) signaling over telephone lines. DTMF signaling operates by sending and detecting different combinations of two individual tones, which can be generated by a simple circuit in a telephone set. This type of signaling has been used for dialing and switching purposes, as well as for end-user control applications, such as Interactive Voice Response (IVR) systems. More recently, telephone conversations generated with DTMF-based telephone sets are also being sent over packet-switched networks, such as the Internet.

SUMMARY OF THE INVENTION

In one general aspect, the invention features a method of facilitating telephony communication over a packet-switched network. This method includes detecting signaling tones in an audio stream and blocking them from the stream in response to the detecting step. After the blocking step, the audio stream is sent over an undependable audio channel in the packet-switched network.

The signaling tones detected in the detecting step can be sent over a dependable control channel instead of the undependable audio channel. The detecting step can include a filtering step. The detecting step can include a low-pass filtering step, a low band-pass filtering step, and a high band-pass filtering step. The detecting step can include determining if a result of the low-pass filtering step is too large, determining if results of the band-pass filtering steps are too small, and determining if results of the band-pass filtering steps are too different. The detecting step can include a step of phase-shifting results of the steps of filtering. The detecting step can include steps of performing statistical ratio tests to determine if the steps of filtering are each applied to only one tone in their respective pass bands. The detecting step can include steps of performing statistical ratio tests, which can include a root of a sum of powers divided by a root of a sum of powers. The detecting step can detect DTMF tones as the signaling tone.

In another general aspect, the invention features an audio detection and suppression system for use in connection with packet-switched networks that includes means for detecting signaling tones in an audio stream and means for suppressing the signaling tones in the stream detected by the means for detecting before they are sent from an audio output over an undependable audio channel in the packet-switched network.

The system can include means for sending the signaling tones over a dependable control channel instead of the undependable audio channel. The means for detecting can include a low band-pass filter and a high band-pass filter, which can be FIR filters. The means for detecting can include means for phase-shifting outputs of the filters. The means for detecting can include means for performing statistical ratio tests to determine if the filters each contain only one tone in their respective pass bands. The means for detecting can include means for performing statistical ratio tests, which can include means for performing a root of a sum of powers of absolute values divided by a root of a sum of powers of absolute values. The means for detecting can include a low-pass filter, a low band-pass filter, and a high band-pass filter. The means for detecting can include means for determining if an output of the low-pass filter is too large, means for at determining if outputs of the band-pass filters are too small, and means for determining if outputs of the band-pass filter are too different. The means for detecting can include means for detecting DTMF tones as the signaling tone.

In a further general aspect, the invention features a method of facilitating telephony communication over a packet-switched network that includes passing an audio stream through a system having at least one filter prior to an audio output, detecting a selected audio signal in the audio stream utilizing the at least one filter, and blocking the selected audio signal from passage through the audio output in response to the detecting step. The selected audio signal can be a DTMF tone.

In another general aspect, the invention features a method of detecting a selected signal in a digital signal that includes the step of decimating the digital signal to obtain a decimated digital signal, applying a statistical test to the decimated digital signal, and determining whether the selected signal is present in the digital signal based on the result of the applying step.

The method can include issuing a signal over a control channel in response to a result of the determining step. The step of applying a statistical function can apply a statistical ratio function to the decimated digital signal. This function can include a root of a sum of powers of absolute values divided by a root of a sum of powers of absolute values. The selected audio signal can be a DTMF tone.

It has been found that passing a DTMF control signal over a packet switched voice/audio channel is unreliable and in certain instances can cause miscommunication over packet switched networks, including Internet applications. Thus, Internet telephony applications can suffer reliability problems because the DTMF signaling is carried over an unreliable audio channel. This is because DTMF tones carried in-band via unreliable User Datagram Protocol (UTDP) sockets are subject to packet loss thereby opening the possibility of single DTMF assertion (such as one key press) being interpreted as multiple key presses of the same digit. Interaction with IVR systems requires a one-to-one correspondence between the actual key pad hits and DTMF tones recognized in order to function properly.

The present invention can resolve DTMF miscommunication problems in a clear and straightforward manner. It can be applied to Internet Gateways that connect the public telephone system to the Internet and therefore need DTMF signaling to conduct telephony protocol. The present invention can solve the above-described problems by sending and receiving DTMF signaling over a dependable control channel instead of an undependable audio channel.

DETAILED DESCRIPTION OF AN ILLUSTRATIVE EMBODIMENT

Figure 1:
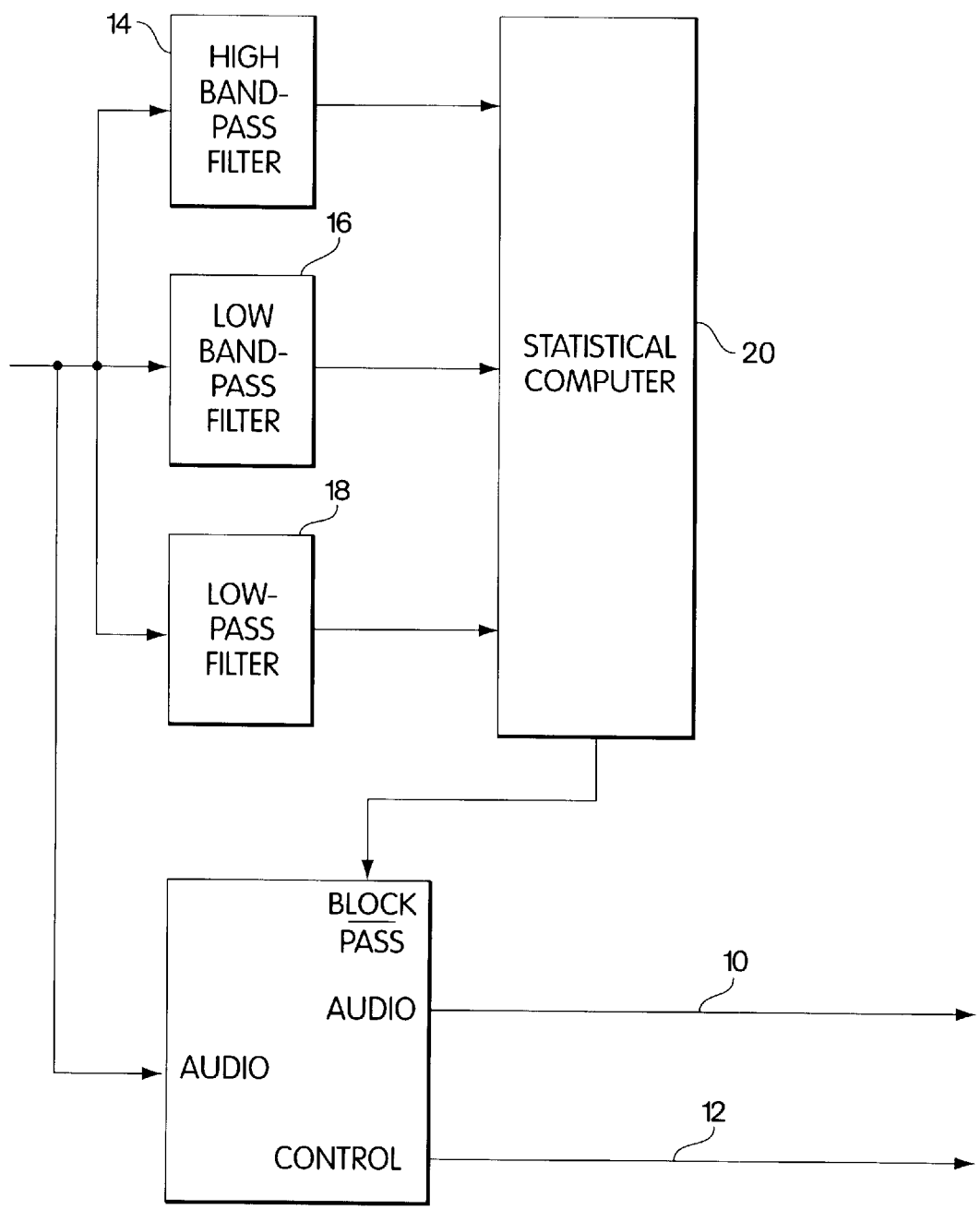
FIG. 1 is a block diagram illustrating features of an embodiment according to the invention.
Figure 2:
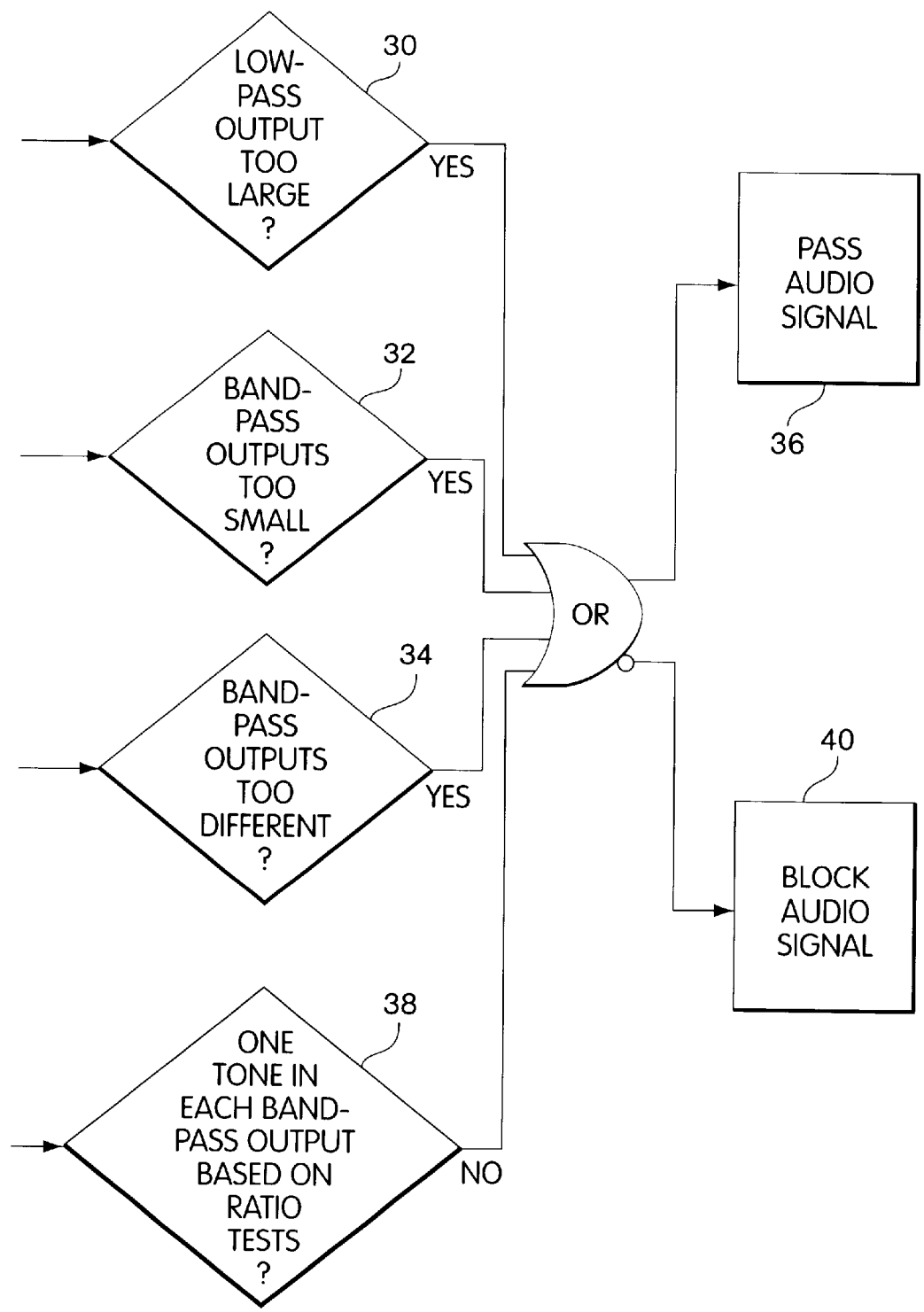
FIG. 2 is a flow diagram illustrating operation of the embodiment according to the invention.

Referring to FIGS. 1 and 2, a methodology is provided to detect and then extract a DTMF signal from an audio channel 10, as is a methodology to insert the DTMF signal over a control channel 12. To this end, a means first is provided to detect and suppress the DTMF signal on the audio channel. This is accomplished by providing three filters in parallel. A low-pass filter 14, a low band-pass (row frequencies) filter 16, and a high band-pass (column frequencies) filter 18 are provided. The output of these filters can be decimated by as much as 7. It is a computational convenience to decimate all three filters by the same amount, but this may be varied according to techniques well known to those skilled in the art. In the next step, statistics are computed on the outputs of the filters to determine if a DTMF tone pair is present (20). The Root Mean Square (RMS) of the outputs are utilized as the signal amplitudes. If the low-pass filter output is too large (step 30), the signal is passed (step 36). If the band-pass outputs are too small (step 32), once again, the signal is passed (step 36). If the band-pass output amplitudes are too different (step 34), once again, the signal is passed (step 36).

Finally, one of a variety of ratio tests are provided to determine if the two band-pass filters each contain only one tone in their respective pass bands (step 38). Only if it is determined that one tone is in each band-pass-filter output will the signal from the main audio output be blocked (step 40).

The ratio tests referenced above can include peak to RMS, fourth root of average of 4-th power to RMS, RMS to average of absolute value, and a general n-th root of the sum of the n-th powers/the m-th root of the sum of m-th powers where both n and m must be even and n must be greater than m. The restriction on n and m being even can be relaxed by using the n-th root of the sum of the absolute value of n-th powers/the m-th root of the sum of the absolute value of the m-th powers. The number 'm' can be as small as 1, and m and n need not even be integers. Of course, the actual performance of the division and root extraction can be avoided by multiplying and raising to powers instead. The statistics on the filter outputs must be computed on the basis of sliding windows of approximately 40 msec. A variety of overlap, window lengths, and strategies may be used depending on the block size of the vocoder and other subsequent audio processing steps.

For best performance, the ratio tests should be performed on the band-pass filter (BPF) outputs and also on approximately 45 degree and approximately 90 degree phase shifted versions of the filter outputs. These phase shifts can be performed with length 3 Finite Impulse Response (FIR) filters. If all 3 ratio tests on a BPF output and the 2 phase shifted versions yield a ratio smaller than a threshold chosen by comparing 1 and 2 tone statistics for the chosen ratio test, then the BPF output contains only one significant tone. If both BPF outputs (high and low band) have this property then DTMF is present. The threshold can be adjusted slightly in order to make tradeoffs between talk-off (DTMF false alarms caused by voice) and DTMF detection.

In a preferred embodiment of the present invention FIR filters of length 21 may be utilized. The 3 dB bandwidth of the low-pass filter may be approximately 500 Hz. The ripple (approximately 1 dB) passband of the low band-pass filter may be approximately 680 to 965 Hz. The ripple (approximately 1 dB) passband of the high band-pass filter may be approximately 1179 to 1674 Hz.

When properly apportioned, DTMF channel tone will be detected and suppressed on the audio channel. Thus, there is described above a new methodology of passing DTMF tones over a packet-switched voice audio channel by suppressing the DTMF tone on the audio channel.

In one embodiment, detection is performed by a TMS 320C51 DSP processor. The chosen statistical function uses the conditions m=1 and n=2 (i.e., the square root of the sum of squares divided by the sum of absolute values) over a 40 milisecond window. This embodiment also evaluates the statistical function on the Hilbert transform of the band pass filter outputs. The statistical function is evaluated on the sum of the band pass filter output and the Hilbert transform of the band pass filter output as well. This is done separately for each of the two band pass filters. The Hilbert transform can be approximated as a convolution of the signal with (1,0,−1). The system can be configured to compensate for computational delays.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A method of facilitating telephony communication over a packet-switched network, the method comprising:
   detecting a signaling tone in an audio stream,
   suppressing at least a portion of the signaling tone detected in the audio stream in response to detecting the signaling tone, and
   sending the audio stream over an undependable audio channel in the packet-switched network in response to detecting the signaling tone.

2. The method of claim 1 wherein the audio stream is sent over the undependable audio channel in the packet-switched network after suppressing the at least a portion of the signaling tone.

3. The method of claim 1 wherein the at least a portion of the signaling tone is suppressed sufficiently to block recognition of the signaling tone in the audio stream.

4. The method of claim 1 further including sending the detected signaling tone over a dependable control channel instead of the undependable audio channel.

5. The method of claim 1 wherein the detecting includes filtering.

6. The method of claim 1 wherein the detecting includes low band-pass filtering and high band-pass filtering.

7. The method of claim 6 further comprising determining if results of the low and high band-pass filtering are too small, and determining if results of the low and high band-pass filtering are too different.

8. The method of claim 6 wherein the detecting further includes low-pass filtering.

9. The method of claim 8 wherein the detecting further includes phase-shifting results of the low band-pass and high band-pass filtering.

10. The method of claim 9 wherein the detecting further includes performing statistical ratio testing to determine if the low band-pass and high band-pass filtering are each applied to only one tone in their respective pass bands.

11. The method of claim 1 wherein the detecting includes performing statistical ratio testing.

12. The method of claim 11 wherein the statistical ratio testing include determining a root of a sum of powers divided by a root of a sum of powers.

13. The method of claim 1 wherein the signaling tone is a DTMF tone.

14. An audio system for use in connection with a packet-switched network, the system comprising:
- a detector configured to detect a signaling tone in an audio stream; and
- a tone suppressor configured to suppress at least a portion of the detected tone sufficiently to block detectability of the signaling tone, and to send the audio stream over an undependable audio channel in the packet-switched network, in response to the detector detecting the signaling tone.

15. The system of 14 wherein the tone suppressor is configured to suppress the at least a portion of the detected tone before the tone suppressor sends the audio stream over the undependable audio channel in the packet-switched network.

16. The system of claim 14 further comprising a transmitter configured to send the signaling tone over a dependable control channel of the packet-switched network instead of the undependable audio channel.

17. The system of claim 14 wherein the detector includes a low band-pass filter and a high band-pass filter.

18. The system of claim 17 wherein the filters are FIR filters.

19. The system of claim 17 wherein the detector further includes a phase shifter configured to phase shift outputs of the filters.

20. The system of claim 17 wherein the detector further includes a processor configured to perform statistical ratio tests to determine if the filters each contain only one tone in their respective pass bands.

21. The system of claim 14 wherein the detector further includes a processor configured to perform statistical ratio tests.

22. The system of claim 21 wherein the statistical ratio tests include a root of a sum of powers of absolute values divided by a root of a sum of powers of absolute values.

23. The system of claim 14 wherein the detector includes a low-pass filter, a low band-pass filter, and a high band-pass filter.

* * * * *